(12) United States Patent
Ahladas et al.

(10) Patent No.: US 7,768,222 B2
(45) Date of Patent: Aug. 3, 2010

(54) AUTOMATED CONTROL OF ROTATIONAL VELOCITY OF AN AIR-MOVING DEVICE OF AN ELECTRONICS RACK RESPONSIVE TO AN EVENT

(75) Inventors: Steven J. Ahladas, Highland, NY (US); Gary N. Goth, Pleasant Valley, NY (US); Robert P. Makowicki, Staatsburg, NY (US); Katie L. Pizzolato, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/031,952

(22) Filed: Feb. 15, 2008

(65) Prior Publication Data

US 2009/0207880 A1 Aug. 20, 2009

(51) Int. Cl.
*H02P 7/00* (2006.01)
*H02P 31/00* (2006.01)

(52) U.S. Cl. .................. 318/471; 318/472; 318/473; 318/461; 361/687

(58) Field of Classification Search ............ 318/400.08, 318/471–473, 476, 461, 268; 361/687; 417/321; 388/811, 819
See application file for complete search history.

(56) References Cited

U.S. PATENT DOCUMENTS

| | | | | |
|---|---|---|---|---|
| 4,667,480 A * | 5/1987 | Bessler | ................ | 62/180 |
| 5,963,424 A * | 10/1999 | Hileman et al. | ............. | 361/695 |
| 6,005,762 A * | 12/1999 | Hiroi | ................ | 361/103 |
| 6,396,231 B1 * | 5/2002 | Horng et al. | ................ | 318/471 |
| 6,414,843 B1 * | 7/2002 | Takeda | ................ | 361/679.48 |
| 6,428,282 B1 * | 8/2002 | Langley | ................ | 417/2 |
| 6,617,815 B1 * | 9/2003 | Krief | ................ | 318/471 |
| 7,194,646 B1 * | 3/2007 | Watts, Jr. | ................ | 713/322 |
| 2002/0101715 A1 * | 8/2002 | Osecky et al. | ................ | 361/687 |
| 2003/0011984 A1 * | 1/2003 | Chu et al. | ................ | 361/687 |
| 2004/0139256 A1 * | 7/2004 | Lee | ................ | 710/104 |
| 2006/0133032 A1 * | 6/2006 | Uchida et al. | ................ | 361/687 |
| 2007/0096665 A1 * | 5/2007 | Ku et al. | ................ | 318/66 |
| 2008/0170947 A1 * | 7/2008 | Sutardja | ................ | 417/32 |

OTHER PUBLICATIONS

Ellsworth et al., "System and Method for Facilitating Cooling of a Liquid-Cooled Electronics Rack", U.S. Appl. No. 11/942,207, filed Nov. 19, 2007.

* cited by examiner

*Primary Examiner*—Paul Ip
(74) *Attorney, Agent, or Firm*—Geraldine Monteleone, Esq.; Kevin P. Radigan, Esq.; Heslin Rothenberg Farley & Mesiti P.C.

(57) ABSTRACT

Automated control is provided of rotational velocity of an air-moving device cooling an electronics subsystem of an electronics rack. The automated control includes: automatically responding to a failure event associated with the electronics subsystem of the rack by setting rotational velocity of the air-moving device to a first upper limit (RPM1) above a normal operating limit; sensing motor temperature of a motor of the air-moving device; automatically increasing rotational velocity of the air-moving device to a second upper limit (RPM2) if the sensed motor temperature is below a first predefined temperature threshold (T1), wherein RPM2>RPM 1; maintaining rotational velocity of the air-moving device at the second upper limit while the sensed motor temperature is below a second predefined temperature threshold (T2), wherein T2>T1; and returning to normal operating rotational velocity of the air-moving device subsequent to servicing of the electronics rack responsive to the event.

20 Claims, 5 Drawing Sheets

AUTOMATED CONTROL OF ROTATIONAL VELOCITY OF AN AIR-MOVING DEVICE OF AN ELECTRONICS RACK RESPONSIVE TO AN EVENT

TECHNICAL FIELD

The present invention relates in general to methods and systems for cooling rack-mounted assemblages of electronics subsystems, such as rack-mounted computer server units, and more particularly, to an automated control technique for facilitating cooling of one or more electronics subsystems of an electronics rack subsequent to a failure event and during servicing of the electronics rack responsive to the failure event.

BACKGROUND OF THE INVENTION

The power dissipation of integrated circuit chips, and the modules containing the chips, continues to increase in order to achieve increases in processor performance. This trend often poses a cooling challenge at both the modular and system levels. Increased airflow rates are often need to effectively cool high powered modules and to limit the temperature of the air that is exhausting into the data center.

In many large server applications, processors, along with their associated electronics (e.g., memory, disc drives, power supplies, etc.), are packaged in removable node configurations aligned within a rack or frame. In other cases, the electronics may be in a fixed location within the rack or frame.

Typically, the components of an electronics rack are cooled by air moving in parallel airflow paths, usually front-to-back, and propelled by one or more air-moving devices (e.g., fans or blowers). The rotational velocity of the air-moving device within the electronics rack is conventionally fixed by the manufacturer to account for a variety of ambient temperature, altitude, heat load, configuration and motor variations that will effect the maximum safe rotational velocity of the air-moving device. Existing solutions employ one or more of these variables, such as anticipated ambient temperature, in defining the maximum rotational velocity (e.g., RPMs) of the air-moving device. Generally, these existing solutions are weak in that they necessarily assume worst-case operating environment scenarios, and hence deliver rotational velocities less than technically feasible for a given air-moving device. These generalized constraints can be particularly problematic in the event of a failure of one or more electronics components within an associated electronics subsystem of the electronics rack being cooled. The failure of a particular component may result in other components within the electronics subsystem generating increased heat flux while the failing component is in failure state.

SUMMARY OF THE INVENTION

The shortcomings of the prior art are overcome, and additional advantages are realized through, in one aspect, the provision of a method of controlling rotational velocity of an air-moving device of an electronics rack. The method includes: automatically responding to an event associated with one or more electronics subsystems of the electronics rack by setting rotational velocity of the air-moving device to a first upper limit (RPM1); sensing motor temperature of a motor of the air-moving device; automatically increasing rotational velocity of the air-moving device to a second upper limit (RPM2) if the sensed motor temperature is below a first predefined temperature threshold (T1), wherein RPM2>RPM1; maintaining rotational velocity of the air-moving device at the second upper limit (RPM2) while the sensed motor temperature is below a second predefined temperature threshold (T2), wherein T2>T1; and returning to a normal operating rotational velocity of the air-moving device subsequent to servicing of the electronics rack responsive to the event.

In another aspect, a system for cooling one or more electronics subsystems of an electronics rack is provided. The system includes: an air-moving device associated with the electronics rack for facilitating air-cooling of one or more electronics subsystems thereof, and a controller coupled to the air-moving device for controlling rotational velocity of the air-moving device. The controller: automatically responds to an event associated with the one or more electronics subsystems of the electronics rack by setting rotational velocity of the air-moving device to a first upper limit (RPM1); senses motor temperature of a motor of the air-moving device; automatically increases rotational velocity of the air-moving device to a second upper limit (RPM2) if the sensed motor temperature is below a first predefined temperature threshold (T1), wherein RPM2>RPM1; maintains rotational velocity of the air-moving device at the second upper limit (RPM2) while the sensed motor temperature is below a second predefined temperature threshold (T2), wherein T2>T1; and automatically returns the air-moving device to a normal operating rotational velocity subsequent to servicing of the electronics rack responsive to the event.

Further, an article of manufacture is provided herein which includes at least one computer-usable medium having computer-readable program code logic for controlling rotational velocity of an air-moving device of an electronics rack. The computer-readable program code logic, when executing, performing the following: automatically responding to an event associated with one or more electronics subsystems of the electronics rack by setting rotational velocity of the air-moving device to a first upper limit (RPM1); sensing motor temperature of a motor of the air-moving device; automatically increasing rotational velocity of the air-moving device to a second upper limit (RPM2) if the sensed motor temperature is below a first predefined temperature threshold (T1), wherein RPM2>RPM1; maintaining rotational velocity of the air-moving device at the second upper limit (RPM2) while the sensed motor temperature is below a second predefined temperature threshold (T2), wherein T2>T1; and returning the air-moving device to a normal operating rotational velocity subsequent to servicing of the electronics rack responsive to the event.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

As used herein, the terms "electronics rack", "rack-mounted electronic equipment", and "rack unit" are used interchangeably, and unless otherwise specified include any housing, frame, rack, compartment, blade server system, etc., having one or more heat generating components of a computer system or electronics system, and may be, for example, a stand alone computer processor having high, mid or low end processing capability. In one embodiment, an electronics rack may comprise multiple electronics subsystems, each having one or more heat generating components disposed therein requiring cooling. "Electronics subsystem" refers to any sub-housing, blade, book, drawer, node, compartment, etc., having one or more heat generating electronic components disposed therein. Each electronics subsystem of an electronics rack may be movable or fixed relative to the electronics rack, with the central electronic complex (CEC) nodes of an IBM System z™ mainframe computer being one example of electronics subsystems of an electronics rack to be cooled. Further, "data center" refers to a computer installation containing one or more electronics racks to be cooled. As a specific example, a data center may include one or more rows of rack-mounted computing units.

Reference is made below to the drawings, which are not drawn to scale to facilitate understanding, and wherein the same reference numbers used throughout different figures designate the same or similar components.

Figure 1:
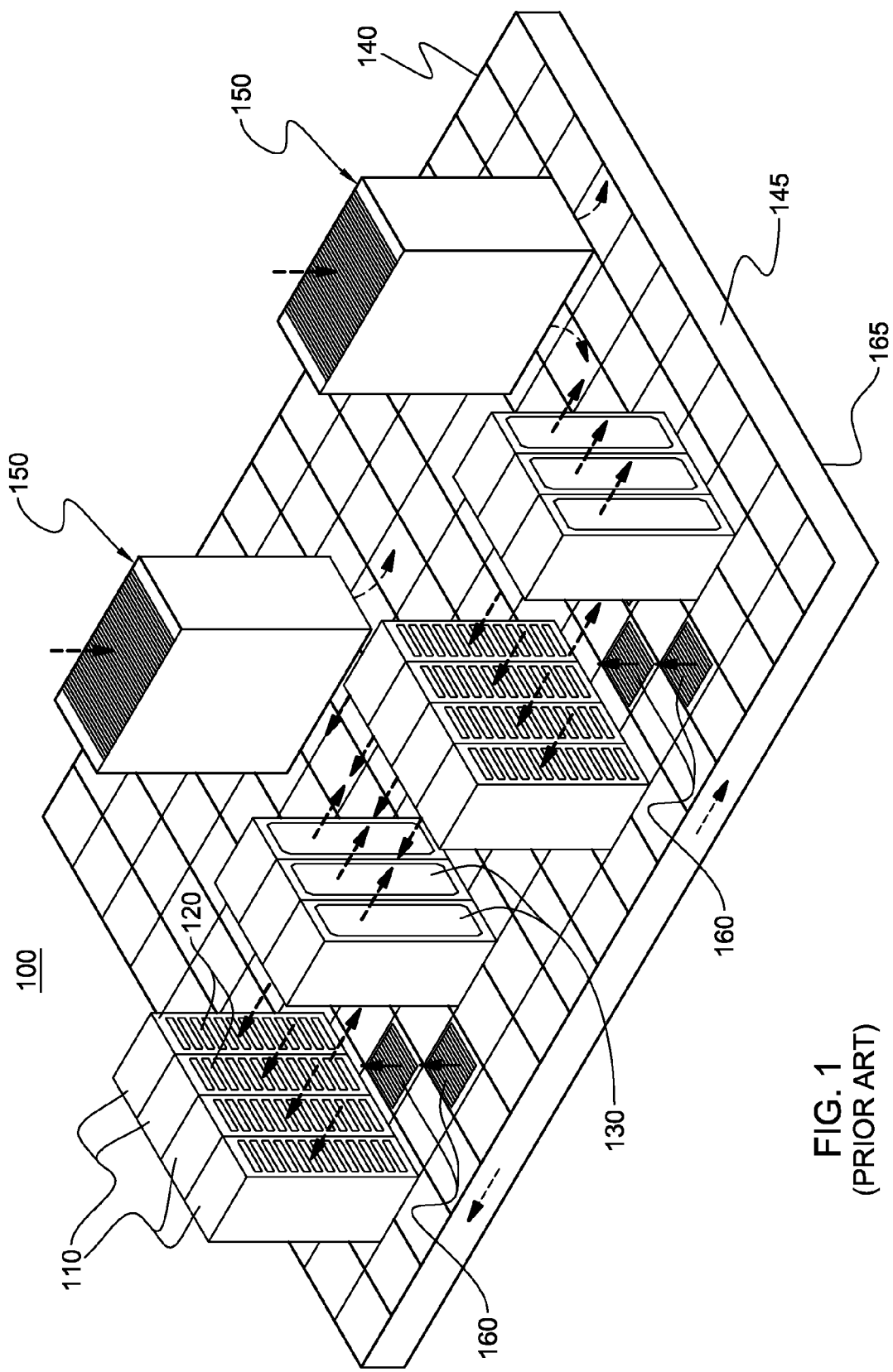
FIG. 1 depicts one embodiment of a conventional raised floor layout of an air-cooled data center.

As shown in FIG. 1, in a raised floor layout of an air cooled computer installation 100 typical in the prior art, multiple electronics racks 110 are disposed in one or more rows. A computer installation such as depicted in FIG. 1 may house several hundred, or even several thousand microprocessors. In the arrangement of FIG. 1, chilled air enters the computer room via floor vents from a supply air plenum 145 defined between the raised floor 140 and a base or sub-floor 165 of the room. Cooled air is taken in through louvered covers at the air inlet sides 120 of the electronics racks and expelled through the air outlet sides 130 of the electronics racks. Each electronics rack 110 may have an air moving device (e.g., fan or blower) to provide forced inlet-to-outlet airflow to cool the electronic components within the subsystem(s) of the rack. The supply air plenum 145 provides filtered and cooled air to the air-inlet sides of the electronics racks via perforated floor tiles 160 disposed in a "cold" aisle of the computer installation. The filtered and cooled air is supplied to plenum 145 by one or more air conditioning units 150, also disposed within the computer installation 100. Room air is taken into each air conditioning unit 150 near an upper portion thereof. This room air comprises in part exhausted air from the "hot" aisles of the computer installation defined, for example, by opposing air outlet sides 130 of electronics racks 110.

Figure 2:
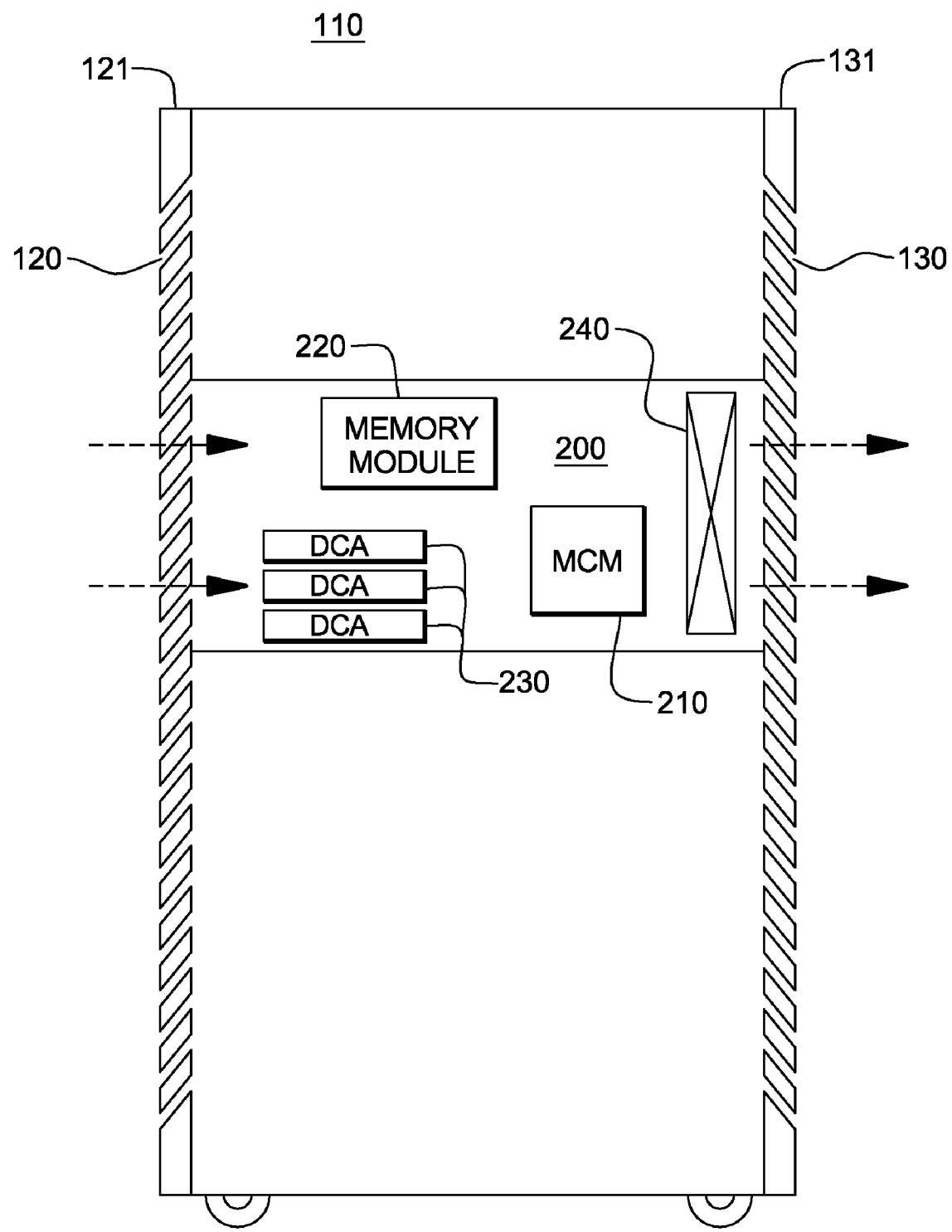
FIG. 2 is an elevational view of a partial embodiment of an electronics rack with an electronics subsystem comprising multiple electronics components cooled by airflow facilitated by one or more air-moving devices, which are controlled in accordance with an aspect of the present invention.

FIG. 2 depicts one embodiment of an electronics rack 110 having an electronics subsystem 200 with one or more air-moving devices associated therewith. As one example, electronics subsystem 200 might comprise a central electronics complex (CEC), such as provided with an IBM System z™ mainframe computer (offered by International Business Machines Corporation, of Armonk, N.Y.). An IBM System z™ mainframe computer may have one to four CECs disposed within one electronics rack, for example, arranged side-by-side within the rack.

Within electronics subsystem 200, one or more multi-chip modules (MCM) 210 are disposed. In one embodiment, MCM 210 rests atop a liquid-cooled cold plate (not shown) of a liquid-based cooling system. For example, one or two modular water-cooling units (MWCUs) (not shown) may be disposed in a lower portion of the electronics rack. Such a liquid-based cooling system is described in co-pending, commonly assigned U.S. patent application Ser. No. 11/942,207, filed Nov. 19, 2007, and entitled "System and Method for Facilitating Cooling of a Liquid-Cooled Electronics Rack", which is hereby incorporated herein by reference in its entirety.

As illustrated in FIG. 2, electronics subsystem 200 includes supporting electronics for MCM 210, including one or more memory modules 220, and multiple distributed converter assembly (DCA) power supplies 230. These supporting electronic components are air-cooled employing one or more air-moving devices 240 (e.g., fans or blowers) positioned to move air across the electronics subsystem, for example, from air inlet side 120 to air outlet side 130 thereof, as illustrated in FIG. 2. In one embodiment, electronics rack 110 may include an air inlet doors 121 or one or more air outlet doors 131, each of which is hingedly mounted to the frame of the electronics rack, to facilitate assembly and servicing of the electronic components within the electronics rack. In the embodiment illustrated, air inlet door 121 and air outlet door 131 are louvered to facilitate the ingress and egress of external air through the electronics rack.

Figure 3:
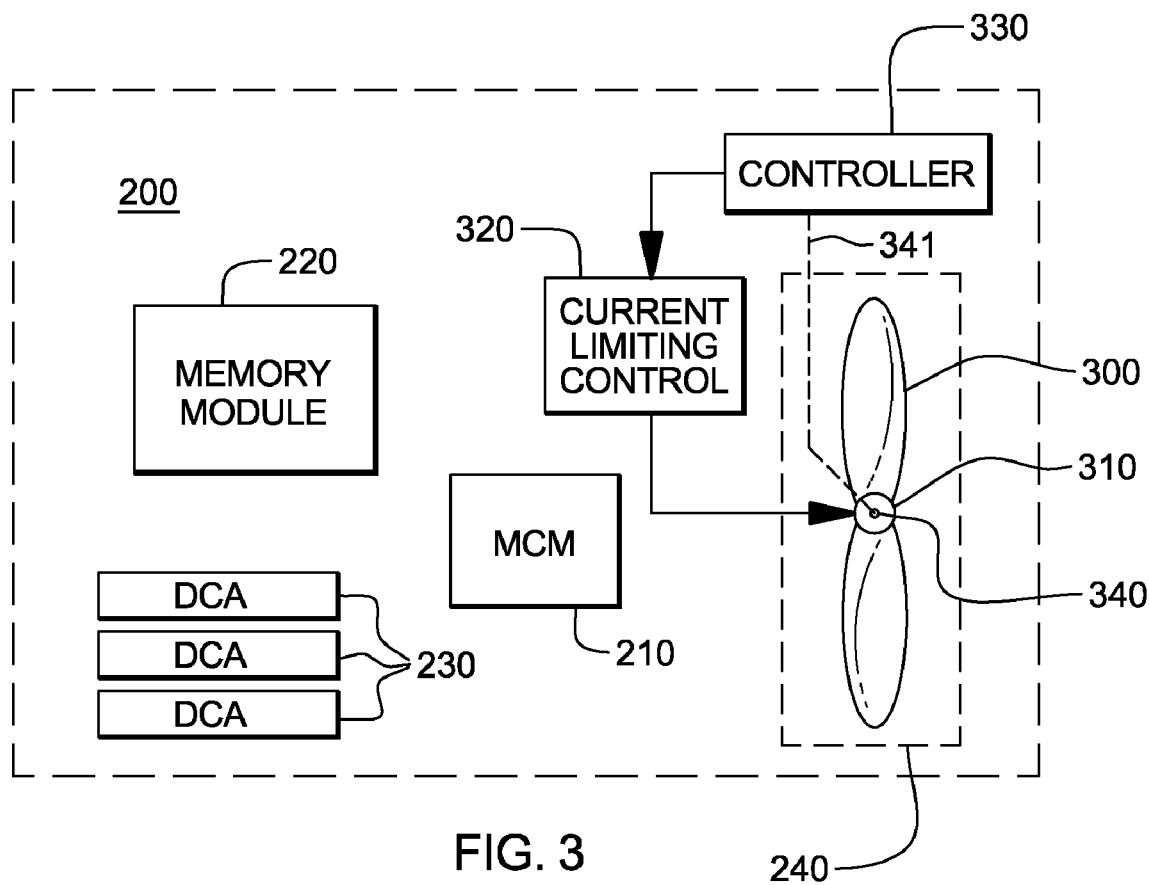
FIG. 3 is a simplified schematic of one embodiment of the electronics subsystem of FIG. 2, and illustrating a controller, current limiting control, and temperature sensor associated with the air-moving device for automated control of rotational velocity thereof, in accordance with an aspect of the present invention.

FIG. 3 depicts electronics subsystem 200 of FIG. 2, illustrating one detailed embodiment of an air-moving device 240 and an automated controller 330 associated therewith, in accordance with an aspect of the present invention. As noted, electronics subsystem 200 includes one or more multi-chip modules (MCM) 210, which as noted, may be liquid-cooled, employing one or more liquid-cooled cold plates (not shown). Supporting electronics for multi-chip module 210 includes one or more memory modules 220, such as one or more DIMMs, and one or more subsystem power supplies, such as the three distributed converter assembly (DCA) supplies 230 illustrated.

As shown in FIG. 3, air-moving device 240 includes an air-moving blade assembly 300, typically driven by a motor 310 at a normal operating rotational velocity. As noted initially, the rotational velocity of an air-moving device within an electronics rack is conventionally set by the rack manufacturer to account for a variety of anticipated ambient temperature, altitude, heat load, configuration and motor variations, which taken together effect the safe, operating rotational velocity of the air-moving device. Conventional solutions employ one or more of these variables, such as anticipated ambient temperature, in defining the normal operating rotational velocity of the air-moving device.

These existing solutions are generally weak, however, in that they necessarily assume worst-case operating environment scenarios, and hence deliver rotational velocities less than technically feasible for a given air-moving device in a given set of conditions. This limitation can be problematic in the event of a failure of one or more electronics components within the electronics subsystem being air-cooled. For example, if there is a failure of a power component, such as one DCA 230 in the electronics subsystem, it would be advantageous for the air-moving device to further increase airflow to address increased heat flux resulting, for example, from the remaining DCA components taking over at least a portion of the load of the failing DCA component. By monitoring and adjusting air-moving device rotational velocity based on actual temperature of the motor 310, higher rotational velocities can be safely achieved since the worst-case environmental conditions or configurations rarely occur.

In the following discussion, failure of a DCA component is described as a failure event to which the controller automatically responds by adjusting rotational velocity of one or more air-moving devices. This is provided by way of example only. The failure event could be failure of any associated electronics component within the electronics subsystem which results in a higher heat flux, and hence a greater need for air-cooling. Alternatively, the event could be other than a failure event. For example, due to a change in airflow impedance, it may be desirable to automatically increase rotational velocity of one or more air-moving devices within an electronics rack contemporaneous with a site engineer opening the air inlet door or air outlet door of the electronics rack.

Automated control of rotational velocity of an air-moving device is achieved herein by incorporating a temperature sensor 340 (such as a thermistor) internal to or within the windings of motor 310. A controller 330 is coupled to temperature sensor 340 via an appropriate data line 341 and the temperature data obtained from the temperature sensor is employed by the controller in automatically controlling rotational velocity of a given air-moving device 240. For example a current limit control 320 is employed to control the rotational velocity of the air-moving device. Alternatively, a variable frequency drive coupled to the motor could be adjusted by the controller, resulting in a corresponding adjustment in the rotational velocity of the air-moving device. In one example, the thermal sensor 340 is embedded in the most temperature-sensitive region of the motor windings, and the controller employs the sensed motor temperatures in automatically adjusting rotational velocity of the air-moving device, for example, to temporarily increase air-cooling responsive to a failure event.

Figure 4:
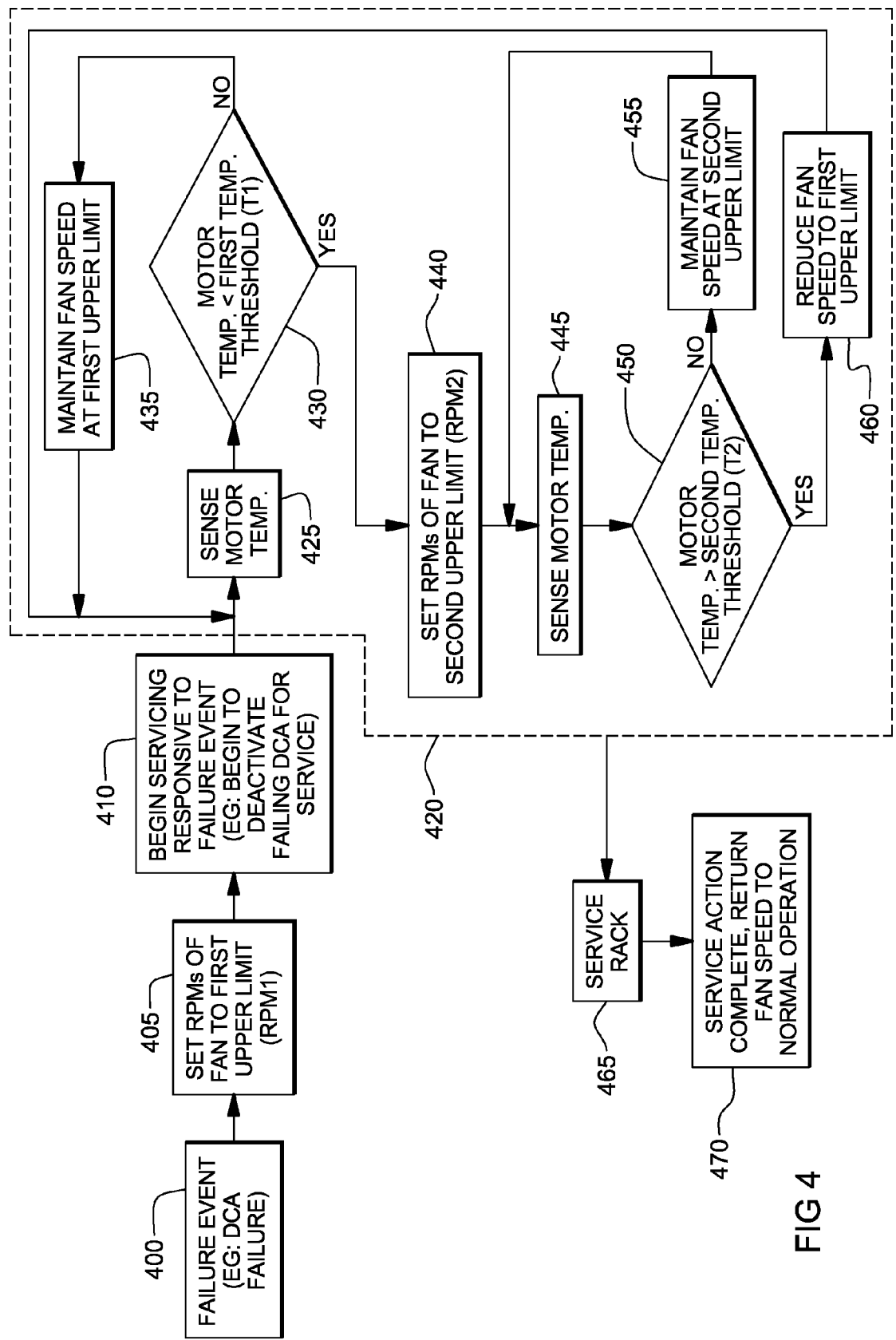
FIG. 4 is a flowchart of one embodiment of a control process implemented by the controller of FIG. 3, in accordance with an aspect of the present invention.

FIG. 4 illustrates one embodiment of a control process implemented by controller 330 (FIG. 3). Again, this control process is provided by way of example only, with the automated adjustment of rotational velocity of the air-moving device being applicable generally to a number of events occurring in relation to the electronics rack. Referring to FIG. 4, a failure event, such as a DCA failure, is assumed to occur 400. The distributed converter assembly is a highly dense package from a current density standpoint. Upon one DCA failing, the remaining DCAs take over at least a portion of the load of the failing DCA, and hence generate a higher heat flux. Therefore, enhanced air-cooling of the electronics subsystem is desirable in this failure state to prevent overheating of one or more electronics components within then subsystem.

Responsive to the failure event, the controller automatically sets (e.g., increases) rotational velocity of the air-moving device to a first upper limit (RPM1) 405. (In the process of FIG. 4, the "fan" is one example of the air-moving device being controlled). In practice, the rotational velocity of the air-moving device may remain at this first upper limit (RPM1) for a matter of minutes, hours, or days until, for example, a site engineer services the electronics rack to address the failure event. At the time of servicing, the site engineer begins the servicing 410, for example, by beginning to deactivate the failing DCA. Those skilled in the art will understand that a failing DCA may still be operating at some level within the electronics subsystem, and thus, deactivation may be necessary prior to replacement of the DCA.

In the illustrated process, the controller automatically responds to the beginning of the servicing of the electronics rack with a servicing protocol 420. The servicing protocol includes the controller sensing the motor temperature 425 and determining whether the motor temperature is below a first predefined temperature threshold (T1) 430. If "no", then the controller maintains the fan speed at the first upper limit (RPM1) 435, and loops back to again sense motor temperature and determine whether the motor temperature has dropped below the first predefined temperature threshold (T1). If desired, an appropriate delay could be incorporated into this loop.

If, or once, the motor temperature drops below the first predefined temperature threshold (T1), then the controller sets the rotational velocity of the fan to the second upper limit (RPM2) 440. The controller then senses motor temperature 445 and determines whether the sensed motor temperature is greater than a second predefined temperature threshold (T2), wherein T2>T1. If "no", then processing maintains the fan speed at the second upper limit (RPM2) 455, and loops back to again sense motor temperature 445. This loop repeats until servicing is completed or the sensed motor temperature exceeds the second predefined temperature threshold (T2). If the sensed motor temperature exceeds the second predefined temperature threshold (T2), the controller reduces the fan speed to the first upper limit (RPM1) 460 before looping back to sense the motor temperature 425 and monitor whether motor temperature is below the first predefined temperature threshold (T1).

Those skilled in the art will note that in this example, the first predefined temperature threshold (T1) is selected to be a temperature threshold below a normal maximum operating temperature limit, while the second predefined temperature threshold (T2) may be selected to be above the normal maximum operating temperature threshold. By way of specific example, the first predefined temperature threshold (T1) might be 120° C., with a motor design which has a maximum normal operating temperature threshold of 135° C., while the second predefined temperature threshold (T2) might be 150° C., which is a temperature considered acceptable for the limited period of time needed to service the electronics rack. Contemporaneous with controlling the rotational velocity of the air-moving device 420, the electronics rack is serviced 465, and upon completion of the service action, the controller returns the fan speed to the normal rotational velocity operating point 470.

The detailed description presented above is discussed in terms of procedures which can be executed on a computer, a network or a cluster of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as increasing or decreasing, which are commonly associated with manual operations performed by a human operator. No such intervention of a human operator is necessary in the operations described herein which form part of the present invention; the operations may be implemented as automatic machine operations. Useful machines for performing the operations of the present invention include general purpose digital computers or similar devices.

Aspects of the invention are preferably implemented in a high level procedural or object-oriented programming language to communicate with a computer. However, the inventive aspects can be implemented in assembly or machine language, if desired. In any case, the language may be a compiled or interpreted language.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 5:
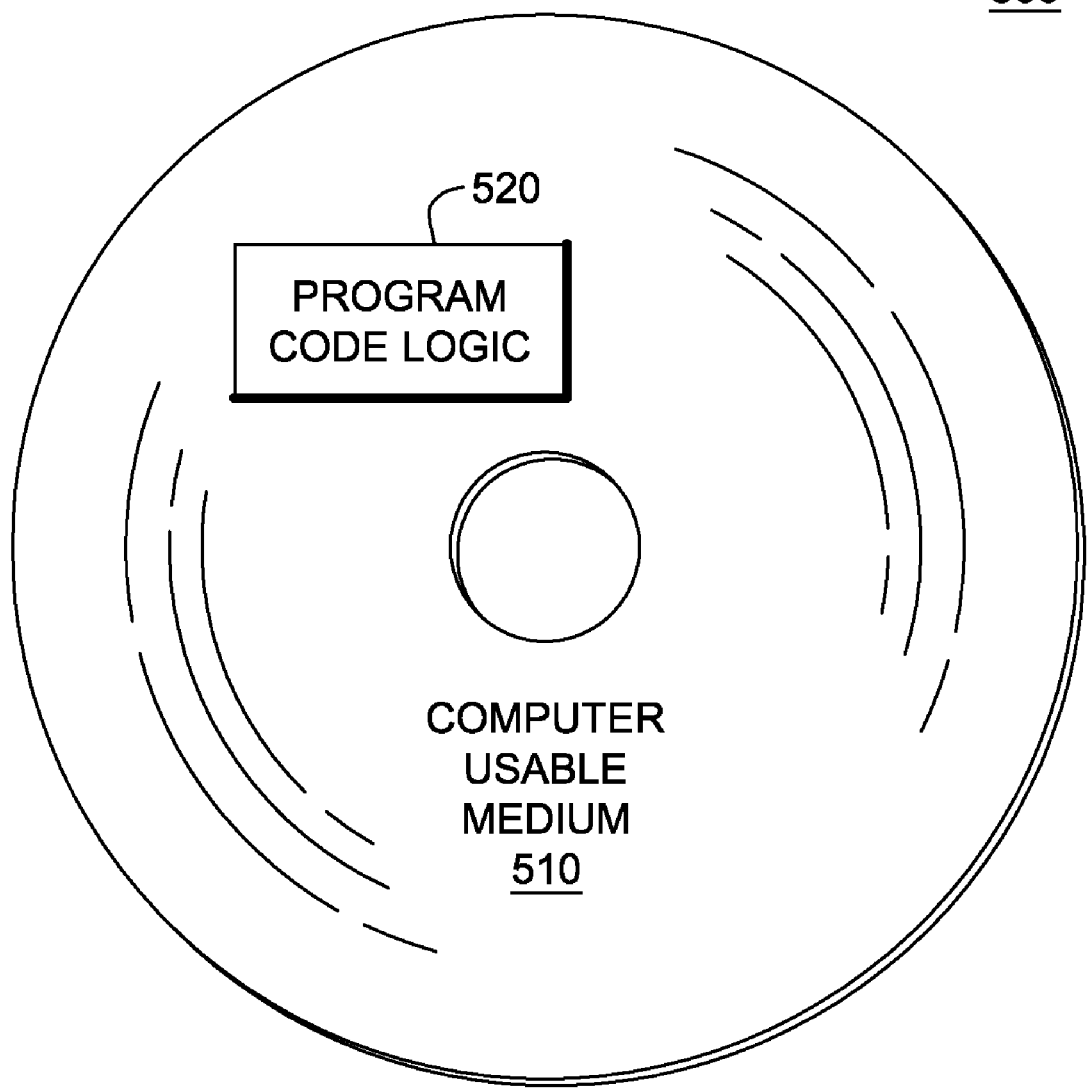
FIG. 5 depicts one embodiment of a computer program product incorporating one or more aspects of the present invention.

One example of an article of manufacture for a computer program product incorporation one or more aspects of the present invention is described with reference to FIG. 5. A computer program product 500 includes, for instance, one or more computer-usable media 510 to store computer-readable program code means or logic 520 thereon to provide or facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read-only memory (CD-ROM), compact disk-read/write (CD-R/W), and DVD.

Aspects of the invention may be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another environment (such as a partially clustered computing environment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computing environment. The required structure for a variety of these systems will appear from the description given.

The capabilities of one or more aspects of the present invention can be implemented in software, firmware, hardware or some combination thereof.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling rotational velocity of an air-moving device of an electronics rack, the method comprising:

automatically responding to an event associated with one or more electronics subsystems of the electronics rack by setting rotational velocity of the air-moving device to a first upper limit (RPM1);

sensing motor temperature of a motor of the air-moving device;

automatically increasing rotational velocity of the air-moving device to a second upper limit (RPM2) if the sensed motor temperature is below a first predefined temperature threshold (T1), wherein RPM2>RPM1;

maintaining rotational velocity of the air-moving device at the second upper limit (RPM2) while the sensed motor temperature is below a second predefined temperature threshold (T2), wherein T2>T1; and returning to a normal operating rotational velocity of the air-moving device subsequent to servicing of the electronics rack responsive to the event.

2. The method of claim 1, wherein the event comprises a failure event occurring within one or more electronics subsystems of the electronics rack, and wherein the automatically increasing rotational velocity of the air-moving device to the second upper limit (RPM2) occurs contemporaneous with servicing of the electronics rack responsive to the event.

3. The method of claim 2, wherein the failure event is a distributed converter assembly (DCA) failure event occurring within an associated electronics subsystem of the electronics rack.

4. The method of claim 1, wherein setting rotational velocity of the air-moving device to the first upper limit (RPM1) comprises automatically increasing rotational velocity of the air-moving device from the normal operating value to the first upper limit (RPM1) responsive to the event.

5. The method of claim 4, wherein the automatically increasing rotational velocity of the air-moving device to the first upper limit (RPM1) further comprises maintaining rotational velocity of the air-moving device at the first upper limit (RPM1) if the sensed motor temperature is above the first predefined temperature threshold (T1).

6. The method of claim 5, further comprising continuing to periodically sense motor temperature of the motor of the air-moving device, and comparing sensed motor temperature to the first predefined temperature threshold (T1), and wherein the automatically increasing rotational velocity of the air-moving device to the second upper limit (RPM2) comprises automatically increasing rotational velocity of the air-moving device to the second upper limit (RPM2), contemporaneous with servicing of the electronics rack, once the sensed motor temperature drops below the first predefined temperature threshold (T1).

7. The method of claim 1, wherein the automatically increasing rotational velocity of the air-moving device to the second upper limit (RPM2) occurs contemporaneous with servicing of the electronics rack responsive to the event, and the maintaining further comprises periodically sensing motor temperature of the motor of the air-moving device after increasing rotational velocity of the air-moving device to the second upper limit (RPM2), and comparing the periodically sensed motor temperature to the second predefined temperature threshold (T2), and maintaining rotational velocity of the air-moving device at the second upper limit (RPM2) while the sensed motor temperature is below the second predefined temperature threshold (T2).

8. The method of claim 7, further comprising automatically reducing rotational velocity of the air-moving device from the second upper limit (RPM2) to the first upper limit (RPM1) if the periodically sensed motor temperature rises above the second predefined temperature threshold (T2).

9. The method of claim 1, wherein the sensing comprises employing a temperature sensor positioned between windings of the motor of the air-moving device in sensing the motor temperature.

10. The method of claim 1, wherein increasing rotational velocity of the air-moving device comprises increasing a current limit for the motor of the air-moving device to raise the rotational velocity of the air-moving device.

11. The method of claim 1, wherein prior to automatically responding to the event, rotational velocity of the air-moving device is at the normal operating limit, the normal operating limit being below the first upper limit (RPM1), and wherein the automatically increasing rotational velocity of the air-moving device to the second upper limit (RPM2) occurs contemporaneous with servicing of the electronics rack responsive to the event.

12. A system for cooling one or more electronics subsystems of an electronics rack, the system comprising:
an air-moving device associated with the electronics rack for facilitating air-cooling the one or more electronics subsystems;
a controller coupled to the air-moving device for controlling rotational velocity of the air-moving device, the controller:
automatically responding to an event associated with the one or more electronics subsystems of the electronics rack by setting rotational velocity of the air-moving device to a first upper limit (RPM1);
sensing motor temperature of a motor of the air-moving device;
automatically increasing rotational velocity of the air-moving device to a second upper limit (RPM2) if the sensed motor temperature is below a first predefined temperature threshold (T1), wherein RPM2>RPM1;
maintaining rotational velocity of the air-moving device at the second upper limit (RPM2) while the sensed motor temperature is below a second predefined temperature threshold (T2), wherein T2>T1; and
automatically returning the air-moving device to a normal operating rotational velocity subsequent to servicing of the electronics rack responsive to the event.

13. The system of claim 12, wherein the event comprises a failure event occurring within the one or more electronics subsystems of the electronics rack, and wherein the automatically increasing rotational velocity of the air-moving device to the second upper limit (RPM2) occurs contemporaneous with servicing of the electronics rack responsive to the failure event.

14. The system of claim 13, wherein the failure event is a distributed converter assembly (DCA) failure event occurring within an associated electronics subsystem of the electronics rack, and wherein the associated electronics subsystem comprises a central electronics complex (CEC).

15. The system of claim 12, further comprising a temperature sensor positioned between windings of the motor of the air-moving device, the controller being coupled to the temperature sensor for sensing motor temperature of the motor of the air-moving device.

16. The system of claim 12, wherein setting rotational velocity of the air-moving device to the first upper limit (RPM1) by the controller comprises automatically increasing rotational velocity of the air-moving device from the normal operating value to the first upper limit (RPM1) responsive to the event, and wherein the automatically increasing rotational velocity of the air-moving device to the first upper limit (RPM1) further comprises maintaining rotational velocity of the air-moving device at the first upper limit (RPM1) if the sensed motor temperature is above the first predefined temperature threshold (T1), and wherein the controller further periodically senses motor temperature of the motor of the air-moving device, and compares sensed motor temperature to the first predefined temperature threshold (T1) and the automatically increasing rotational velocity of the air-moving device to the second upper limit (RPM2) includes automatically increasing rotational velocity to the second upper limit (RPM2), contemporaneous with servicing of the electronics rack, once the sensed motor temperature drops below the first predefined temperature threshold (T1).

17. The system of claim 12, wherein the automatically increasing rotational velocity of the air-moving device to the second upper limit (RPM2) occurs contemporaneous with servicing of the electronics rack responsive to the event, and the controller further periodically senses motor temperature of the motor of the air-moving device after increasing rotational velocity of the air-moving device to the second upper limit (RPM2), and compares the periodically sensed motor temperature to the second predefined temperature threshold (T2), and maintains rotational velocity of the air-moving device at the second upper limit (RPM2) while the sensed motor temperature is below the second predefined temperature threshold (T2), and wherein the controller automatically reduces rotational velocity of the air-moving device from the second upper limit (RPM2) to the first upper limit (RPM1) if the periodically sensed motor temperature rises above the second predefined temperature threshold (T2).

18. An article of manufacture comprising:
at least one computer-usable medium having computer-readable program code logic for controlling rotational velocity of an air-moving device of an electronics rack, the computer-readable program code logic when executing performing the following:
automatically responding to an event associated with one or more electronics subsystems of the electronics rack by setting rotational velocity of the air-moving device to a first upper limit (RPM1);
sensing motor temperature of a motor of the air-moving device;
automatically increasing rotational velocity of the air-moving device to a second upper limit (RPM2) if the sensed motor temperature is below a first predefined temperature threshold (T1), wherein RPM2>RPM1;

maintaining rotational velocity of the air-moving device at the second upper limit (RPM2) while the sensed motor temperature is below a second predefined temperature threshold (T2), wherein T2>T1; and returning the air-moving device to a normal operating rotational velocity subsequent to servicing of the electronics rack responsive to the event.

19. The article of manufacture of claim 18, wherein the event comprises a failure event occurring within one or more electronics subsystems of the electronics rack, and wherein setting rotational velocity of the air-moving device to the first upper limit (RPM1) comprises automatically increasing rotational velocity of the air-moving device from the normal operating value to the first upper limit (RPM1) responsive to the failure event, and the automatically increasing rotational velocity of the air-moving device to the first upper limit (RPM1) further includes maintaining rotational velocity of the air-moving device at the first upper limit (RPM1) if the sensed motor temperature is above the first predefined temperature threshold (T1), and wherein the automatically increasing rotational velocity of the air-moving device to the second upper limit (RPM2) comprises automatically increasing rotational velocity of the air-moving device to the second upper limit (RPM2), contemporaneous with servicing of the electronics rack, once the sensed motor temperature drops below the first predefined temperature threshold (T1).

20. The article of manufacture of claim 18, wherein the automatically increasing rotational velocity of the air-moving device to the second upper limit (RPM2) occurs contemporaneous with servicing of the electronics rack responsive to the event, and the maintaining further includes periodically sensing motor temperature of the motor of the air-moving device after increasing rotational velocity of the air-moving device to the second upper limit (RPM2), and comparing the periodically sensed motor temperature to the second predefined temperature threshold (T2), and maintaining rotational velocity of the air-moving device at the second upper limit (RPM2) while the sensed motor temperature is below the second predefined temperature threshold (T2), and further automatically reducing rotational velocity of the air-moving device from the second upper limit (RPM2) to the first upper limit (RPM1) if the periodically sensed motor temperature rises above the second predefined temperature threshold (T2).

* * * * *